United States Patent [19]

Yanagimichi et al.

[11] Patent Number: 5,230,019
[45] Date of Patent: Jul. 20, 1993

[54] KEY SIGNAL CONVERSION DEVICE FOR CATV SYSTEM

[75] Inventors: Toyokazu Yanagimichi, Chigasaki; Harumasa Kajita, Fujisawa; Tetsuo Kariya, Fujisawa; Toshikazu Wakabayashi, Fujisawa; Ichiro Kawashima, Chigasaki; Satoshi Nakanami, Kamakura; Masami Tanaka, Yokohama, all of Japan

[73] Assignee: Matsushita Electric Industrial Co., Ltd., Osaka, Japan

[21] Appl. No.: 683,177

[22] Filed: Apr. 9, 1991

[30] Foreign Application Priority Data

Apr. 9, 1990 [JP] Japan .................... 2-93630

[51] Int. Cl.$^5$ .............................. H04N 7/16
[52] U.S. Cl. ........................ 380/21; 380/10; 380/20; 380/28; 380/43
[58] Field of Search ............. 380/7, 10, 15, 20, 21, 380/28, 33, 43

[56] References Cited

U.S. PATENT DOCUMENTS

| | | | |
|---|---|---|---|
| 4,621,285 | 11/1986 | Schilling et al. | 380/15 |
| 4,736,422 | 4/1988 | Mason | 380/20 |
| 4,802,215 | 1/1989 | Mason | 380/21 |
| 4,839,922 | 6/1989 | Imasaki et al. | 380/15 |

FOREIGN PATENT DOCUMENTS

| | | |
|---|---|---|
| 0024530 | 3/1974 | Japan . |
| 0012911 | 2/1975 | Japan . |
| 0106476 | 8/1981 | Japan . |
| 0121385 | 7/1982 | Japan . |

Primary Examiner—Bernarr E. Gregory
Attorney, Agent, or Firm—Wenderoth, Lind & Ponack

[57] ABSTRACT

A key signal conversion device for use in a CATV television system in which more than one different scrambling process is performed, the conversion device receiving one of a scrambled high-frequency signal in a television system and a sound intermediate frequency signal in the television system, extracting a key signal for unscrambling the scrambling in the television system and adding the key signal to a nonscrambled television signal which is to be subsequently scrambled by a process other than a process used to scramble the received signal, the key signal conversion device including: a first detecting circuit, for receiving the one of a scrambled television signal and a sound intermediate frequency signal, and for detecting one of a synchronizing signal of the television signal and a synchronizing signal superimposed on the sound intermediate frequency signal; a gate circuit, for receiving the one of a scrambled television signal and a sound intermediate-frequency signal, and for extracting the key signal therefrom using the synchronizing signal detected by the first detecting circuit; a second detecting circuit, for receiving the nonscrambled television signal, and for detecting a synchronizing signal thereof; and an inserting circuit for superimposing the key signal on the nonscrambled television signal in a predetermined horizontal interval in the vertical blanking interval of the nonscrambled television signal by the gate circuit using the signal detected by the second detecting circuit.

1 Claim, 7 Drawing Sheets

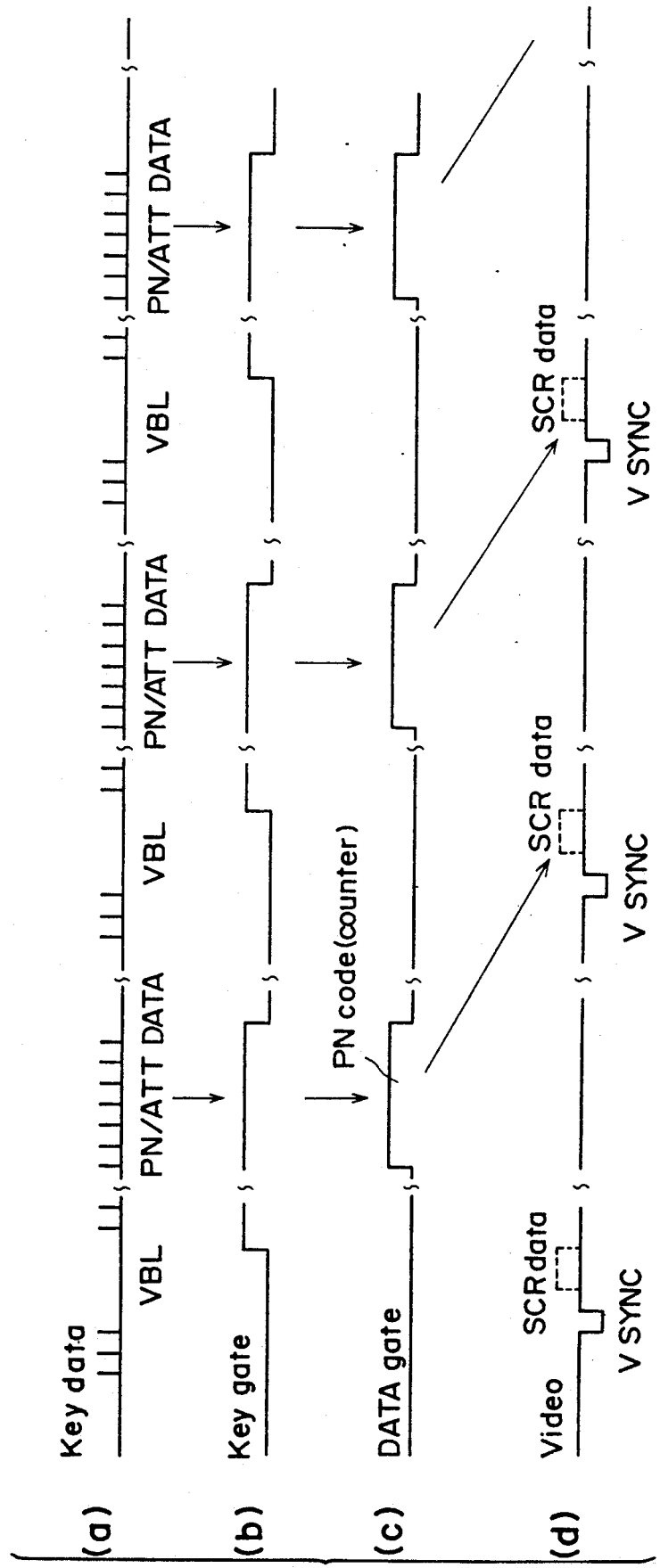

KEY SIGNAL CONVERSION DEVICE FOR CATV SYSTEM

BACKGROUND OF THE INVENTION

1. Field of the Invention

The present invention relates to scramble devices employed in various television systems including cable television (CATV) systems and, more particularly, to key signal conversion devices for extracting a key signal, which is used to unscramble, from a first signal and attaching the key signal to a second signal in the television signal in the TV system.

2. Description of the Prior Art

Recently, services using ground-wave television broadcasting have been confronted with some problems of diversified needs of television viewers. However, ground-wave TV broadcasting cannot satisfy the above needs, because the number of available channels are restricted because of narrow bandwidth for the ground-wave broadcasting. This causes an increase of viewers joining CATV systems using cable networks.

Current CATV systems are expanding their markets, in which the so-called city-type CATV system takes the lead. For this system, pay service is available only to special subscribers. As the pay service is required to be in good concealment, TV signals employed in the CATV systems are subjected to, what is called, scrambling.

The methods of scrambling for use in the CATV systems include, for example, one disclosed in Japanese Patent Application No. 57-121385 equivalent to U.S. Pat. No. 4,621,285. This scrambling method is such a type that the amplitudes of vertical and horizontal pulses contained in radio-frequency (referred to as RF hereinafter) picture carriers are suppressed so that unauthorized TV receivers are prevented from the synchronization of the pay television system. The key data and address data for unscrambling are so arranged as to be obtained from a signal added to a sound carrier using the amplitude modulation technique, as shown in FIG. 1. This scrambling method set forth in the prior art mentioned above is referred to as the sync suppress method.

The present inventor has proposed a CATV system employing the sync suppress method, in Japanese Laid-Open Patent Application No. 56-106476. The CATV system proposed in this prior art is herein explained.

The contents disclosed in the prior art of the present invention are described below with reference to the drawings showing an example for the application to a pay television system utilizing a communication satellite.

First, referring to FIG. 2, reference numeral 1 denotes a transmission unit; element 2 is a receiving unit; and element 3 is a communication satellite. In the transmission unit 1, first a television signal of normal standard method is generated using a television signal generating unit 4 such as a normal studio unit. Then, the television signal is converted into a specific form, such as described later, through a scrambler circuit 5. The converted specific television signal is used to frequency-modulate a carrier signal by a transmitter 6 in which the carrier is subjected to other processes so as to form a SHF band TV signal for transmission from a transmission antenna 7 to the communication satellite 3. The communication satellite 3 receives the SHF band TV signal, which is subjected to frequency-conversion, amplification, or other treatment as required, retransmitting it. The receiving unit 2 in turn receives the SHF-band TV signal from the communication satellite 3 with a reception antenna 8 and the received signal is subjected to a frequency-demodulation and other processes in a converter 9 so as to convert it into a UHF- or VHF-band TV signal, which is applied to an unscrambler circuit 10. In the circuit 10, the UHF or VHF TV signal is processed for unscrambling that is, the reversed conversion of the scrambling process effected in the scrambler circuit 5 so as to obtain a standard TV television signal such as NTSC TV signal, which is applied to a normal television receiver 11, thus allowing one to receive and watch any desired pay television broadcasting. In the arrangement, if the scrambling method for television signals in the scrambler circuit 5 in the transmission unit 1 is of a special type, the broadcasting cannot be caught on the reception side unless there is provided the special unscrambler circuit 10 that is compatible with the applied scrambling method.

In the prior art, if the special television signal is that as shown in FIG. 3 (b), wherein vertical sync pulses, and their preceding and succeeding equalizing pulses are removed from the standard TV signal as shown in FIG. 3(a), an ID signal (Identification signal) formed of a specific code is attached to a specific position within the vertical blanking interval. Such a signal, if incorporated, does not allow ordinary television receivers to catch programs on account of the absence of the vertical sync signal, but permits reception only to receivers having an unscrambler circuit adapted to specially reproduce and interpolate the vertical synchronizing signal.

Among the techniques disclosed in the above-mentioned prior art, it is disclosed also in Japanese Laid-Open Patent Application No. 50-12911 (Prior Art 3) that a portion or a vertical sync signal is removed and suppressed so as to disturb a picture, while the sync signals are restored in a receiver.

As another example, in Japanese Laid-Open Patent Application No. 49-24530 a technique is disclosed in which an address identification signal (ID signal) receivable only by a specific receiving device is inserted instead of either or both sync pulses during the line and field flyback periods of a television signal, as shown in FIGS. 4(a)–4(b), and also the technique that a trigger signal is attached to the television signal, and the horizontal sync signal is generated by a receiving device upon reception of the trigger signal.

Incidentally, the system shown in FIG. 2 is so arranged that the broadcasting service is performed from the transmission unit 1 to the reception unit 2 by the medium of a communication satellite. However, cables also may be used to link the two units 1 and 2 without substantial technical change thereof.

As understood from the above-mentioned prior art, various types of methods are available for transmitting the key signals to release unscramble. The CATV system is a closed network and, in general, the scrambling method for video and audio signals and the transmission method of the key signals are unified into one, respectively.

Disadvantageously, however, there may be some cases in which system compatibility cannot be maintained if the CATV network is system-upgraded or partially system-modified for maintenance due to obsolescence or if the scrambling method is updated to one of better concealment. Still in such cases, the key signal should be used in common for one CATV network so that subscribers utilizing conventional systems also may use it and that computers on the transmission side may be used in common.

SUMMARY OF THE INVENTION

Taking into account the circumstances as described above, it is an object of the present invention to provide a key signal conversion device for extracting a key signal from a television signal or sound signal which has been previously subjected to a first scrambling method and to then insert the decoded key signal into a predetermined period of a television signal to which a second different scrambling method is to be applied.

In order to achieve the foregoing object, according to the present invention, there is provided a key signal conversion device for use in a television system in which a scrambling process is performed, said conversion device receives a scrambled high-frequency signal in a television system or sound intermediate frequency signal in the television system, extracts a key signal for unscrambling in the television system and adds the key signal to a nonscrambled television signal which is to be subsequently scrambled, the key signal conversion device comprising:

a first detecting means, which receives said scrambled television signal or sound intermediate frequency signal, for detecting of a synchronizing signal of said television signal or that of a synchronizing signal superimposed on said sound intermediate frequency signal;

a gate means, which receives said scrambled television signal or sound intermediate frequency signal, for extracting said key signal from said scrambled television signal or sound signal using the synchronizing signal detected by said first detecting means;

a second detecting means, which receives said nonscrambled television signal, for detecting a synchronizing signal thereof; and an inserting means for superimposing the key signal on the nonscrambled television signal in a predetermined horizontal interval in the vertical flyback interval of said nonscrambled television signal by said gate means using the signal detected by said second detecting means.

With the above arrangement, an available key signal is taken out from the previously scrambled signal and superimposed at a desired position of the TV signal which is to be subsequently scrambled. Therefore even if different transmission methods for key signals are incorporated in a CATV network, it is possible to maintain the compatibility between two different scrambling modes.

BRIEF DESCRIPTION OF THE DRAWINGS

FIGS. 7(a)-7(d) are waveform charts for explaining the operation of the key signal conversion device;

DESCRIPTION OF THE PREFERRED EMBODIMENTS OF THE INVENTION

Figure 1:
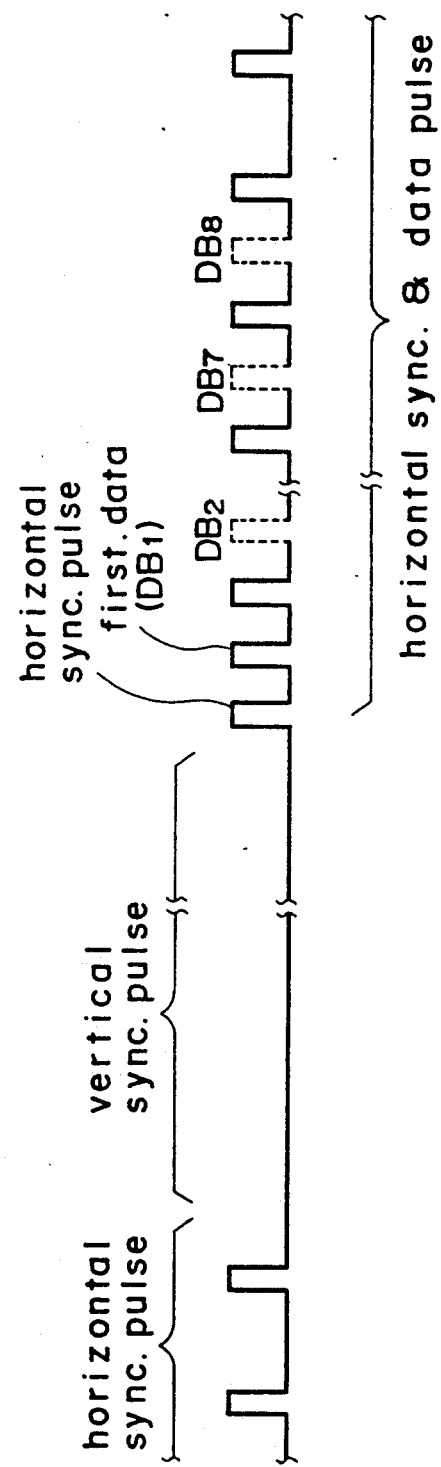
FIG. 1 is a waveform chart showing the format of a signal from which the key signal is to be extracted in this embodiment.
Figure 2:
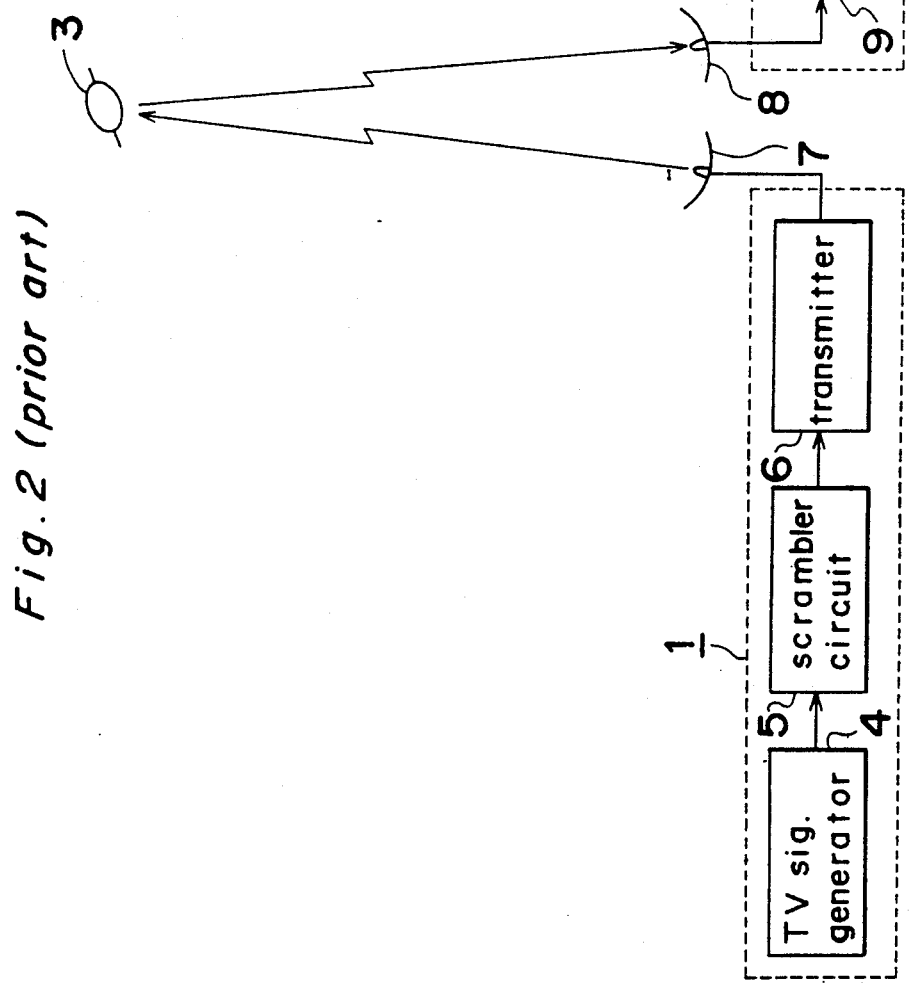
FIG. 2 is a block diagram of a conventional CATV system.
Figure 5:
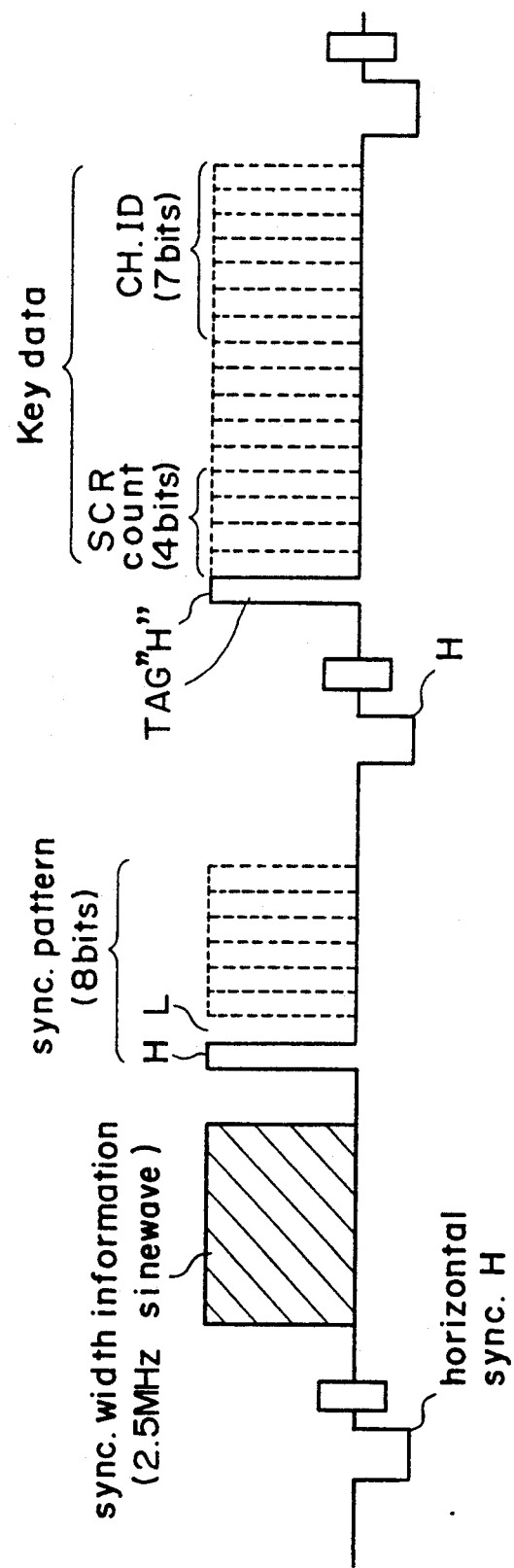
FIG. 5 is a waveform chart for explaining how data is inserted into a nonscrambled second signal of an embodiment of the present invention.

The key signal conversion device for use in a CATV system embodying the present invention is now described with reference to the accompanying drawings. The key signal conversion device of the present invention adopts a method such that a key signal composed of data bit (DB) of 7 bits is extracted from a sound carrier signal as shown in FIG. 1 and inserted as a 4-bit SCR signal, as shown in FIG. 5.

Figure 3:
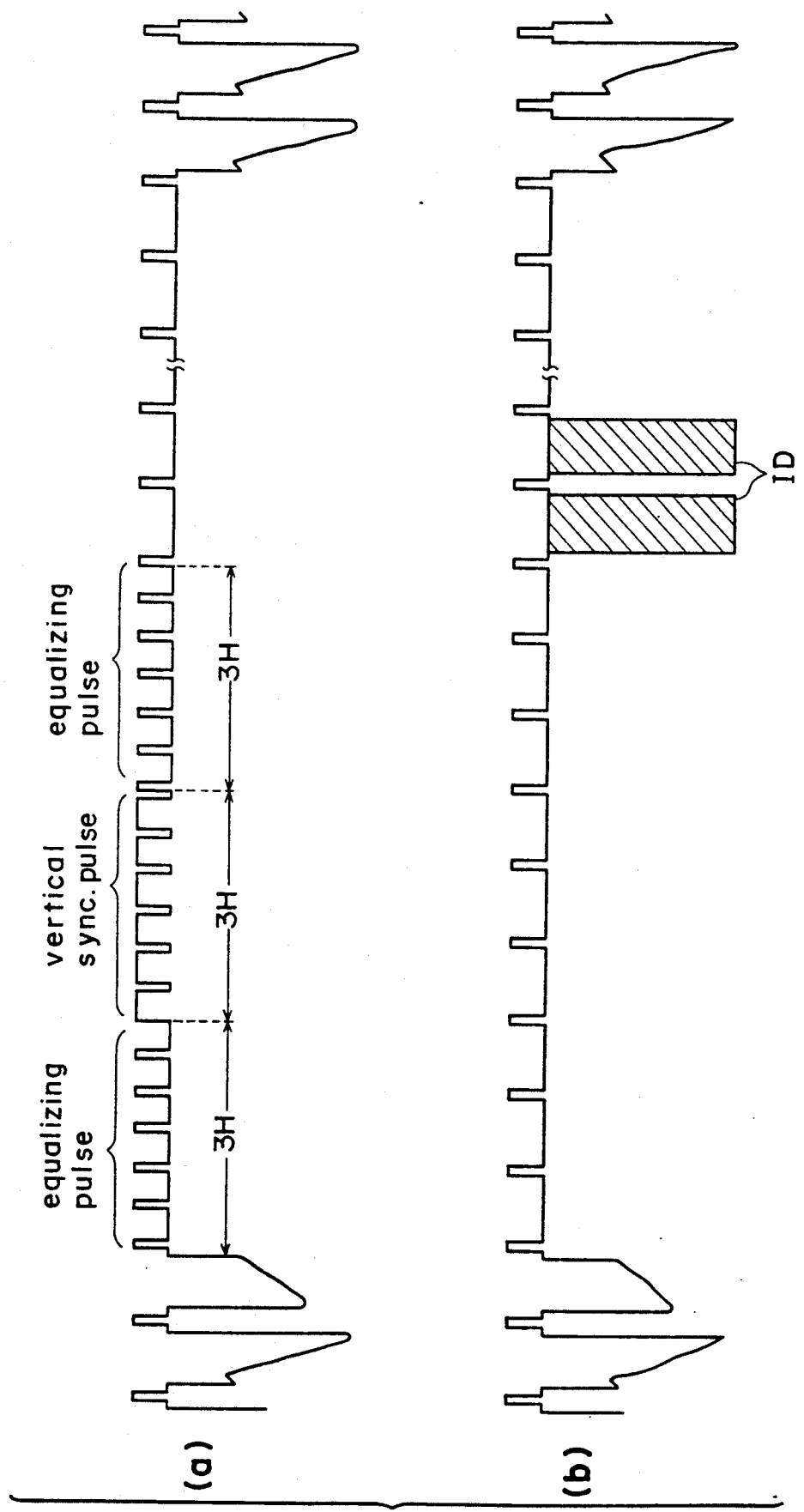
FIGS. 3(a)-3(b) is a are waveform charts of a prior-art television signal.
Figure 4:
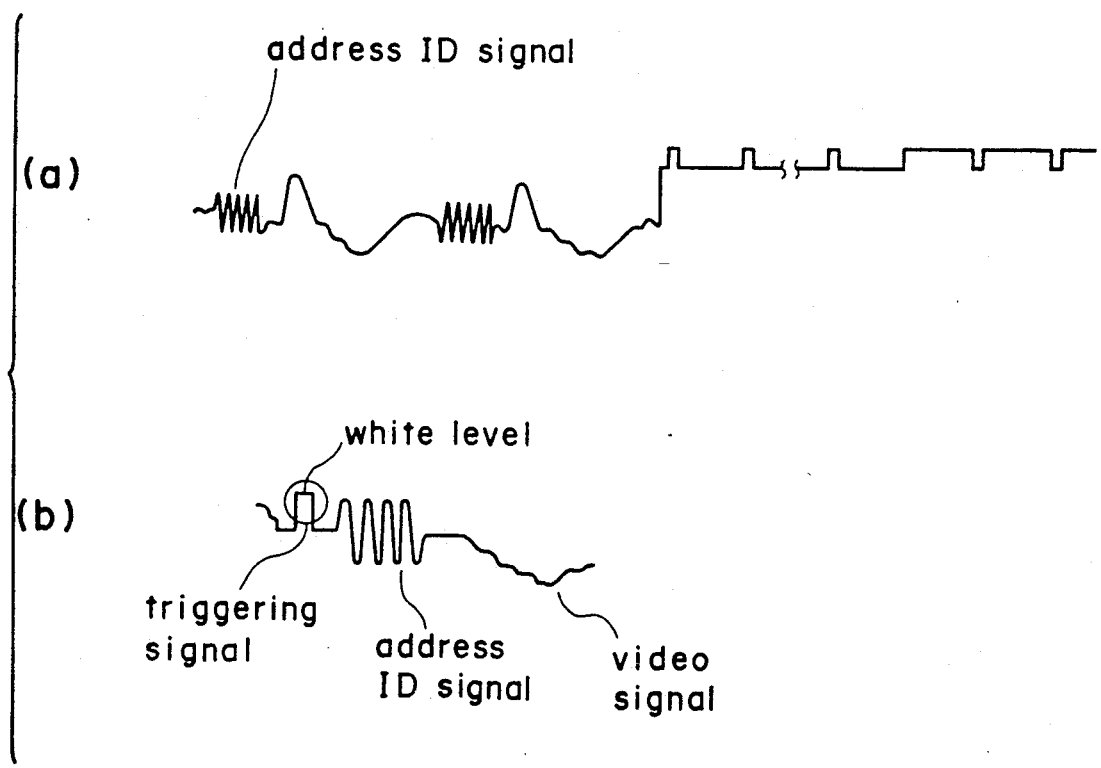
FIGS. 4(a)-4(b) are waveform charts of another prior-art television signal.

The present embodiment employs the sync suppress scrambling method, in which out of the standard television signal in FIG. 3 (a) as an example, synchronization information, i.e. horizontal and vertical sync signals, is suppressed for transmission. FIG. 5 shows the waveform of one vertical flyback period of the television signal which is already subjected to sync suppress. As apparent from FIG. 5, in this embodiment, a synchronizing width information signal, a synchronizing pattern signal, and a key data signal are attached to the vertical flyback period of the sync suppressed TV signal. The key data signal is composed of a 4-bit SCR count signal, which shows what the format of scrambling is, and a channel ID (CHID) signal, which shows whether or not the broadcasting channel is the authorized channel to the subscriber.

First, the sync width information signal succeeding to the suppressed horizontal sync signal with a short time interval is a sine wave signal of 2.5 MHz in the video band frequency. The time length of the sync width information signal is set to a constant. In this case, the time length is approximately 20 $\mu$sec.

After a short time following the sync width information signal, there is provided an 8-bit sync pattern signal. The pulse width per bit of the sync pattern signal is approximately 2 $\mu$sec. The leading bit of this sync pattern signal is used as a marker signal that makes the basis for the timing of the pulse. The sync pattern signal is so positioned that the sync pattern signal can be extracted in synchronism with the edge of a synchronizing width pulse signal obtained by demodulating the sync width information signal. The sync pattern signal can be replaced with a combination of "1" and "0" signals which are compared with the data stored in the receiving unit to decide whether or not a modulated sync width pulse signal makes the basis for reproducing the sync signal. Technically, the sync signal can be reproduced only with the sync width signal information without the sync pattern signal. In this case, however, it is necessary that the time-fluctuation of the sync width information signal can be assumed as zero.

After the sync pattern signal with an interval of amplitude-suppressed horizontal sync signal, there is provided a 16-bit key data signal. The key data signal is composed of a 4-bit scramble (SCR) counter signal succeeding the leading bit (TAG) signal of "H" level, a 5-bit preliminary data signal, and a 7-bit channel ID (CHID) signal, all of which are given in positive logic. The SCR counter signal is a signal for defining the mode of scrambling, showing the suppression level of the sync signal in this embodiment. Although the preliminary data signal is not used in this embodiment, it may be used as a code data signal showing the subscription service level of subscribers as well known. The service level means a level that shows up to which rank of service is allowed to be received in the CATV system in which there is provided ranks in paper view service. The CHID signal is a signal that represents the channel of a scrambled television signal being transmitted. This CHID signal is used to prevent any unauthorized channel from being unfairly changed to an authorized channel. This method of tapping prevention is such that the CHID signal extracted is compared with a channel being received by a converter using, for example, a microcomputer so that reception is inhibited unless they coincide with each other.

Figure 6:
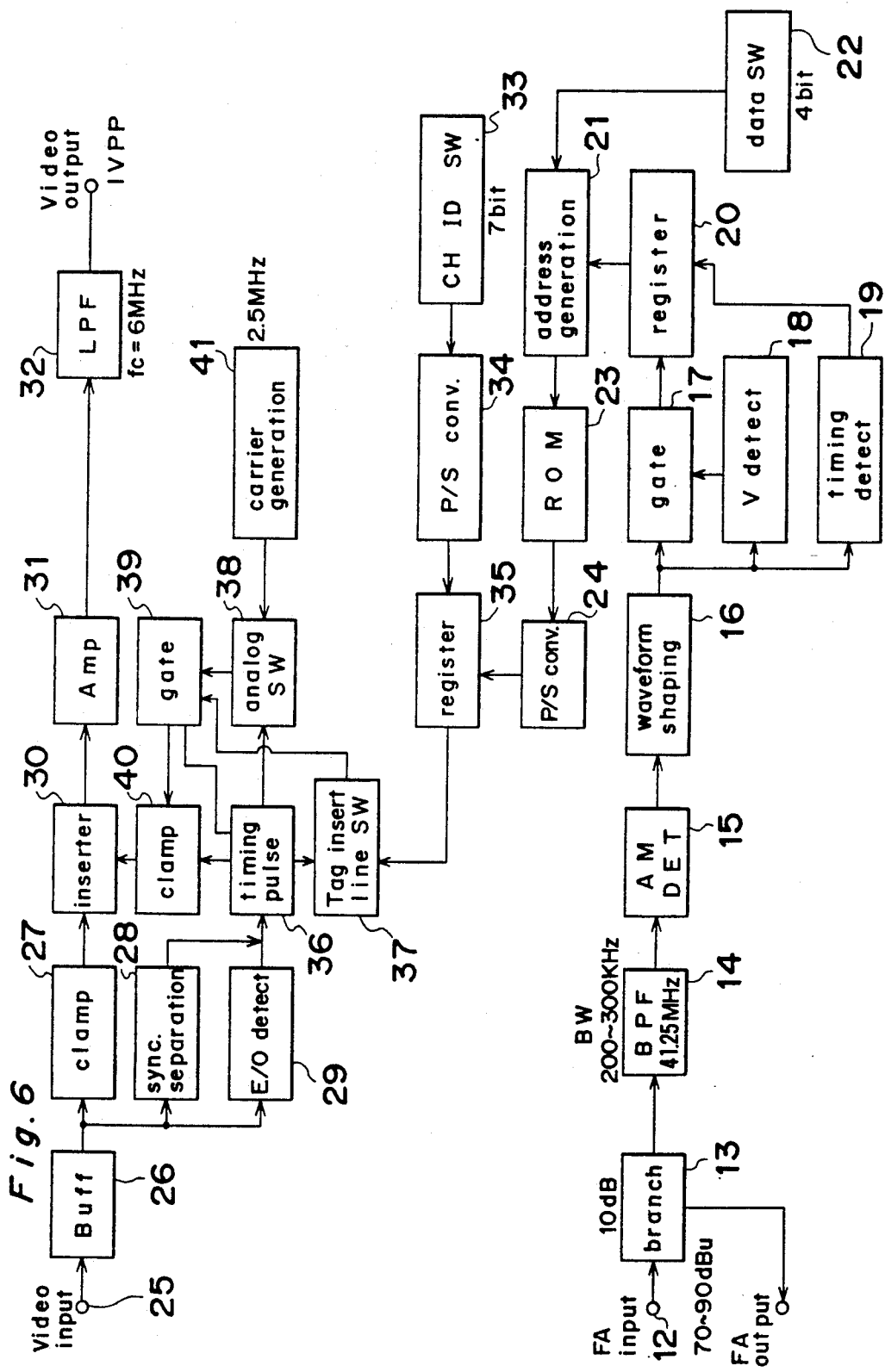
FIG. 6 is a block diagram of an embodiment of a key signal conversion device according to the present invention.

Next, the description is directed to the key signal conversion device in the CATV system for transmitting and receiving scrambled television signals having such format as shown above as high-frequency signals (RF signals). FIG. 6 is a block diagram showing the construction of the key signal conversion device.

In FIG. 6, a sound intermediate frequency signal to which the various sync signals as shown in FIG. 1 are attached is entered into an input terminal 12. The sound intermediate frequency signal is formed by superimposing the sound carrier and the synchronizing information of the television signal using the amplitude-modulation technique. Second, the vertical sync portion of the components of the synchronizing information is removed. Then, data pulse is inserted between two adjacent pulses of the horizontal sync pulses that succeed the vertical sync portion. The data pulse (DB) shown in FIG. 1 has a structure of 8 bits. The leading bit thereof is equivalent to the TAG signal in the signal shown in FIG. 5, while the remaining 7 bits forms a key signal equivalent to the SCR counter signal in a key signal to be obtained in the present invention.

In FIG. 6, the sound carrier signal is input to the input terminal 12. The input sound carrier signal is entered into a branch circuit 13, and a portion of the input signal is entered into a band-pass filter (BPF) 14. The BPF 14 is a filter that has a center frequency of 41.25 MHz and a bandwidth of 200 to 300 kHz. The sound intermediate frequency signal having passed through the BPF 14 is entered into an amplitude detector (AMDET) 15, so that a signal of the waveform shown in FIG. 1 is taken out. This detected signal, including a rounding of the signal in the course of propagation or noise components, is entered into a waveform shaping circuit 16 to shape the pulse waveform.

The waveform-shaped sound intermediate frequency signal is entered into a gate circuit 17, a vertical (synchronizing) interval detector circuit 18 (V detector circuit), and a timing detector circuit 19. The vertical interval (V) detector circuit 18 can be realized by making use of an integration circuit. More specifically, since there is no pulse signal component during the vertical synchronizing interval, the use of the integration circuit allows the determination of whether or not any pulse signal exists, thereby allowing the detection of the vertical synchronizing interval. The timing detector circuit 19, according to the same principle of operation as in the V detector circuit 18, generates a timing signal that shows the position of the DB pulse in the signal of the waveform shown in FIG. 1.

Now the waveform-shaped signal is entered into the gate circuit 17, causing its gate to be opened during a data period succeeding the vertical sync interval of a vertical flyback period. Accordingly, the pulses from the first horizontal sync pulse after the vertical sync interval to the eighth DB pulse DB 8 in FIG. 1 are gated and extracted. The extracted signal is entered into a register 20, which is driven by a timing signal from the timing detector circuit 19. The signal actually stored in the register 20 is therefore a data signal of 8 bits, DB 1 through DB 8. Out of the data signal, DB 1 through DB 8 stored in the register 20, the 7-bit data signal, DB 2 through DB 8 except the data of the leading bit is a signal equivalent to the SCR counter signal.

A conceptual explanation of the operation of extracting the data signal can be expressed, for example, as shown in FIGS. 7(a)-7(d).

The sound carrier signal containing the key data in FIG. 7 (a) passes through a gate having a window such as shown in FIG. 7 (b) and further through a data gate such as shown in FIG. 7 (c), thus the 8-bit data signal, DB 1 through DB 8 being stored into the register 20.

At this point, 7 bits out of the stored data signal, DB 1 through DB 8, i.e. 4 bits of a PN code signal showing the service level and 3 bits of an ATT code signal showing the amplitude suppression level are entered into an address generating circuit 21, from which an address signal corresponding to the 7-bit data pattern is output. The address generating circuit 21 can be driven also by manual operation, in which case data is entered from a data switch (SW) 22 to designate a desired address.

Now, according to the output signal from the register 20 or the designation from the data SW 22, the address generating circuit 21 outputs an address signal for designating an address of a read only memory (ROM) 23 on the succeeding stage. Then, according to this address signal, a 4-bit scramble (SCR) counter signal for defining the mode of scramble is output as a 4-bit parallel signal from the ROM 23. This 4-bit parallel signal, or SCR counter signal is converted into a serial signal by a parallel-serial (P/S) conversion circuit 24 so that a desired 4-bit serial SCR signal is generated.

Next the description is referred to the method of superimposing the SCR signal on a television signal.

In FIG. 6, reference numeral 25 denotes a video input terminal; a standard television signal entered in its terminal 25 is amplified up to a predetermined signal level using a buffer amplifier (Buff) 26. The amplified television signal is entered into a clamping circuit 27, being synchronization-clamped with a synchronizing signal separated by a sync separator circuit 28. Into this television signal stabilized in its signal level by the clamping circuit 27, three types of signals are inserted with an inserter circuit 30, including the synchronizing width information signal, CHID signal, and SCR signal mentioned before. The drive control for the inserter circuit 30 is described later.

The television signal or TV signal into which the three types of data signals have been inserted is amplified by an amplifier circuit (AMP) 31 and, after noise is eliminated through a low-pass filter (LPF) 32, the TV signal is entered into a modulator (not shown), where it is modulated into a video intermediate-frequency (VIF) signal. The sync signal of the VIF signal is sync-suppressed according to the SCR signal to apply scrambling to the video signal. Specific means for the scrambling is not directly related to the present invention, and accordingly, explanation thereof has been omitted here.

In FIG. 6, reference numeral 33 denotes a CHID switch circuit 33, which is a circuit for generating the CHID signal. Although not shown, the CHID switch circuit 33 takes as input a data signal showing the channel of the transmitted TV signal and generates a 7-bit data signal of parallel data corresponding to the channel. The 7-bit data signal is parallel/serial converted by a P/S conversion circuit 34, thereby generating a desired CHID signal of serial data.

The synchronizing pattern signal and SCR counter signal, the former being read from the ROM 23 simultaneously with the latter by the P/S conversion circuit 24, and the CHID signal from the P/S conversion circuit 34 are all entered into a register 35. The arrangement of these signals is as shown in FIG. 5, wherein a key data signal of 16-bit serial data is generated and also a sync pattern signal is arranged. In this case, the output timings from the P/S conversion circuits 24 and 34 need to be controlled with control signals from a microcomputer or the computer so as not to cause any overwrite or misentry of data in the register 35.

The description is now directed to a circuit for controlling the timing at which the synchronizing width information signal, CHID signal, SCR counter signal, and sync pattern signal are inserted by the inserter 30.

First, the TV signal pre-amplified by the buffer amplifier 26 is entered not only into the clamping circuit 27, as described above, but also into an E/O detector circuit 29. The E/O detector circuit 29 decides the field of the TV signal being currently entered, that is, decides whether it is an odd field or even field, so as to output an "H" signal for an odd field and an "L" signal for an even field. If the inserter 30 is operated with the timing set at regular intervals, there arises a deviation of timing between the odd and even fields. The E/O detector circuit 29 is provided to correct this deviation of timing.

The output signal of the E/O detector circuit 29, and the sync signal that is an output signal of the sync separator circuit 28 are entered into a timing pulse generating circuit 36.

Timing pulses generated by the timing pulse generating circuit 36 are supplied to a TAG insertion line switch circuit 37, an analog switch 38, a gate circuit 39, and a clamping circuit 40.

The TAG insertion line switch circuit 37 is adapted to insert an "H" level TAG signal before the sync pattern signal and key data signal retained in the register 35. The TAG signal is a signal that forms a flag for ensuring the detection of the SCR counter signal and CHID signal.

The analog switch 38 is a switch circuit for selectively outputting the oscillation output from a carrier generating circuit 41. The carrier generating circuit 41 generates a sine wave signal of 2.5 MHz, which is limited to a predetermined time length (approx. 20 $\mu$sec) to be a burst-shaped sync width information signal.

The sync pattern signal to which the TAG signal is added, the key data signal, and the sync width information signal are all entered into the gate circuit 39. The outputs from the gate circuit 39 are the sync width information signal, sync pattern signal, TAG signal, and key data signal, which are arranged at timings as shown in FIG. 5. These input signals of the gate circuit 39 are clamped by the clamping circuit 40 according to the synchronizing signal and timing pulses. In this case, the clamping levels of the clamping circuit 40 and the foregoing clamping circuit 27 need to be of a dc level on the basis of, for example, the pedestal level so as not to cause any unnatural difference in the level in the processing of signal insertion into the inserter 30. The various types of data signals and TV signals clamped in this way are inserted or superimposed on one another successfully in the inserter 30.

The method as described heretofore allows the key signal for unscrambling contained in a first signal to be extracted therefrom so that it can be inserted into and superimposed on a second signal different in format from the first signal, as an SCR counter signal for unscrambling.

It is noted that in place of using the sound intermediate frequency signal, the TV signal may be used for extracting the key signal in case the scrambling is added to the TV signal.

According to the present invention, a key signal for unscrambling is extracted from a scrambled first signal and, in format-converted or direct form thereof, added to a second signal to be scrambled. On this condition, scrambling is applied according to the key signal, thereby allowing the key signal to be transmitted with compatibility even if signal transmission methods different in format are involved in the same CATV network. The result of this is that the users of converters subscribing to conventional systems may go on with a conventional transmission format, while new subscribers can enjoy the service by receiving information data the format of which is converted into a new one with the key signal.

What is claimed is:

1. A key signal conversion device for use in a CATV television system in which more than one different scrambling process is performed, said conversation device receiving one of a scrambled high-frequency signal in a television system and a sound intermediate frequency signal in the television system, extracting a key signal for unscrambling the scrambling in the television system and adding the key signal to a nonscrambled television signal which is to be subsequently scrambled by a process other than a process used to scramble said received signal, the key signal conversion device comprising:

a first detecting means, for receiving said one of a scrambled television signal and a sound intermediate frequency signal, and for detecting one of a synchronizing signal of said television signal and a synchronizing signal superimposed on said sound intermediate frequency signal;

a gate means, for receiving said one of a scrambled television and a sound intermediate-frequency signal, and for extracting said key signal therefrom using the synchronizing signal detected by said first detecting means;

a second detecting means, for receiving the nonscrambled television signal, and for detecting a synchronizing signal thereof; and an inserting means for superimposing the key signal on the nonscrambled television signal in a predetermined horizontal interval in the vertical blanking interval of said nonscrambled television signal by said gate means using the signal detected by said second detecting means.

* * * * *